US005504447A

United States Patent [19]

Egging

[11] Patent Number: 5,504,447

[45] Date of Patent: Apr. 2, 1996

[54] TRANSISTOR PROGRAMMABLE DIVIDER CIRCUIT

[75] Inventor: Tim P. Egging, Colorado Springs, Colo.

[73] Assignees: United Memories Inc., Colorado Springs, Colo.; Nippon Steel Semiconductor Corporation, Chiba, Japan

[21] Appl. No.: 472,325

[22] Filed: Jun. 7, 1995

[51] Int. Cl.[6] .......................................... H02M 3/06

[52] U.S. Cl. .......................... 327/334; 327/564; 327/566

[58] Field of Search .......................... 327/334, 530, 327/560, 564, 565, 566; 257/288, 390, 401

[56] References Cited

U.S. PATENT DOCUMENTS 4,500,845 2/1985 Ehni .......................... 330/86
4,509,021 4/1985 van Uden .......................... 330/282
4,609,833 9/1986 Guterman .......................... 327/537
5,245,229 9/1993 Colvin, Sr. .......................... 327/361
5,394,003 2/1995 Bales et al. .......................... 257/416

*Primary Examiner*—Terry Cunningham
*Attorney, Agent, or Firm*—Edward D. Manzo; Ted K. Ringsred

[57] ABSTRACT

The voltage reference generator of the present invention includes a plurality of p-channel transistors configured to act as resistors. Switching transistors, responsive to input signals, are utilized to bypass the resistors when in the "on" state, and enable the resistor when in the "off" state. Thus, when enabled, the resistors become part of a total resistance value in a branch of a voltage divider circuit. A minimum amount of space is used on an integrated circuit because the switching transistors are of the same type as the transistors which are configured to act as resistors.

7 Claims, 9 Drawing Sheets

TRANSISTOR PROGRAMMABLE DIVIDER CIRCUIT

FIELD OF THE INVENTION

This invention relates generally to integrated circuits and more specifically to a programmable voltage reference generator, and its layout configuration.

BACKGROUND OF THE INVENTION

Integrated circuits often require an internal voltage that is different from the external voltage which is provided to the integrated circuit at the power supply input. This internal voltage is oftentimes not known ahead of time. In fact, this internal voltage is often determined during the actual testing of the integrated circuit itself.

To simplify the task of selecting an internal, or reference voltage, voltage reference circuits are typically designed into the power supply part of an integrated circuit. These voltage reference circuits are essentially voltage divider circuits, wherein branches of resistors of varying resistances are available to provide a scaled down voltage.

During the testing stage of integrated circuit production, combinations of branches of resistors are tested to achieve an optimum voltage level. When a desired combination is found, it is selected by either burning one or several fuses, or by adjusting a metal mask to permanently select the combination. These methods suffer from being inflexible, since programming with fuses or metal masks is a one-time only event and cannot be modified should a different optimum voltage level later be desired. Another disadvantage is that oftentimes a fuse is blown before the optimum voltage is reached.

One way of solving the problem of inflexibility associated with programming an optimum voltage level with fuses or metal masks is to use transistor programmability. An example of this prior art method is shown in FIG. 2. In FIG. 2, the top four p-channel transistors 20–23 each have their respective gates tied to ground and are thus always in the on state. In this configuration, each transistor 20–23 acts as a resistor whose resistance value is determined by the area of the respective transistor channel. One or a combination of the four transistor/resistors 20–23 are selected by selecting one or a combination of n-channel switching transistors 30–33 and n-channel enable switch transistors 34–37, which are connected in series with the transistor/resistors 20–23. A disadvantage of using this prior art type of transistor programming is that it occupies a substantial amount of area on the integrated circuit due to the fact that it uses both n-channel and p-channel transistors. See also, Cordoba, Hardee and Butler, U.S. Pat. No. 5,315,230 entitled "Temperature Compensated Voltage Reference For Low and Wide Voltage Ranges" issued May 24, 1994.

SUMMARY OF THE INVENTION

The present invention provides a voltage reference which is both flexible and occupies a minimum amount of space on an integrated circuit. The voltage reference circuit utilizes switching transistors that bypass a resistance value when in the on state, and enable a resistance value when in the off state, thereby causing that resistance value to be part of the total resistance in a branch of the voltage divider circuit. A minimum amount of space is used on an integrated circuit because the switching transistors are of the same transistor type as the transistors which are configured to act as resistors. Besides being more compact, programming with voltage levels results in a dynamic circuit that can be modified at any time during circuit operation.

A further advantage is gained in the present invention in that the enabling or switching transistors can have any size or shape to accommodate the aspect ratio of the resistor chain. This results in saved space, as well as added flexibility for the integrated circuit designer.

BRIEF DESCRIPTION OF THE DRAWINGS

The following detailed description of this invention may be better understood by reference to the following drawings, of which.

DETAILED DESCRIPTION OF THE PREFERRED EMBODIMENTS

The specific embodiments of the present invention will be described below in connection with the Figures. It is to be understood that specific embodiments of this invention may be modified to suit the requirements in other integrated circuits without departing from the scope and spirit of the present invention. The embodiments described herein comprise four transistors/resistors, however, it is to be understood that any number of transistors/resistors may be used to conform to the needs of a specific application.

Figure 1:
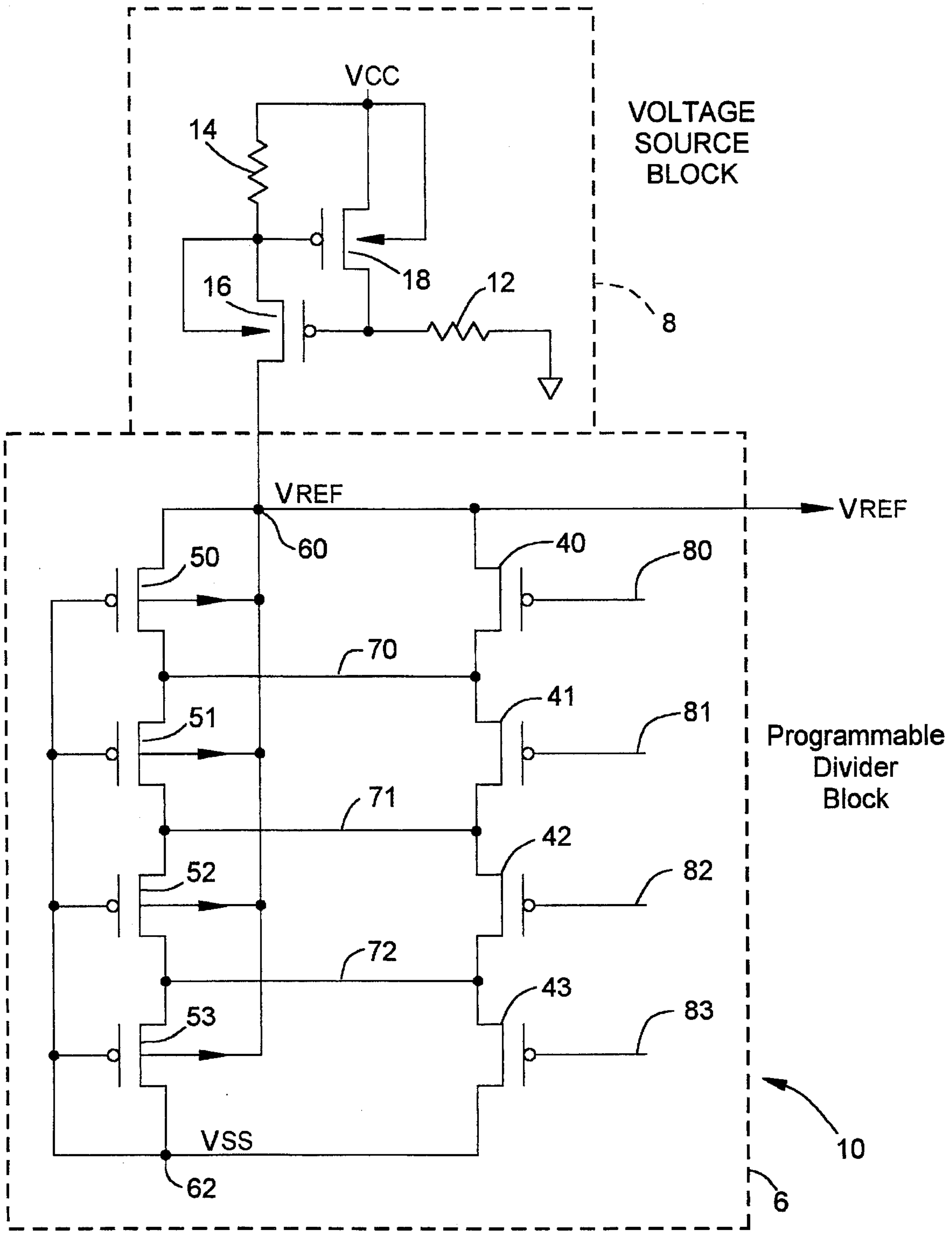
FIG. 1 is a schematic diagram of a first embodiment of a programmable reference generator according to the present invention.

FIG. 1 shows a schematic diagram depicting an application of the first embodiment of the present invention. The voltage reference generator 10 of this embodiment comprises a voltage source block 8 and a programmable divider block 6. The programmable divider block 6 comprises four switching transistors 40–43, four transistors configured to act as resistors 50–53, a voltage reference node ($V_{REF}$) 60, a common node ($V_{SS}$) 62, first through third nodes 70–72, and first through fourth inputs 80–83. The output of voltage reference generator 10 is taken from $V_{REF}$ node 60.

The eight transistors of programmable divider block 6 are p-channel and are sized according to a desired voltage drop across each of their source/drains. Specifically, transistor/resistor 50 is connected to $V_{REF}$ node 60 through its source, its drain is connected to first node 70, and its gate is connected to $V_{SS}$ node 62. Switching transistor 40 is connected to $V_{REF}$ node 60 through its source, its drain is connected to first node 70, and its gate is connected to first input 80. The sources of transistor/resistor 51 and switching transistor 41 are connected to first node 70, while their drains are connected to second node 71. The gate of transistor/resistor 51 is connected to $V_{SS}$ node 62, and the gate of switching transistor 41 is connected to second input 81. The sources of transistor/resistor 52 and switching transistor 42 are connected to second node 71, while their drains are connected to third node 72. The gate of transistor/resistor 52 is connected to $V_{SS}$ node 62, and the gate of switching transistor 42 is connected to third input 82. Finally, the sources of transistor/resistor 53 and switching transistor 43 are connected to third node 72, while their drains are connected to $V_{SS}$ node 62. The gate of transistor/resistor 53 is connected to $V_{SS}$ node 62, and the gate of switching transistor 42 is connected to fourth input 83.

The voltage source block 8 of voltage reference generator 10 is comprised of two resistors 12 and 14, and two transistors 16 and 18. A voltage Vcc is input to voltage source block 8, which produces an output at $V_{REF}$ node 60. Transistors 16 and 18 are p-channel and are configured to act as resistors. Resistor 14 and transistor 16 are connected in series between Vcc and $V_{REF}$ node 60. Transistor 18 and resistor 12 are connected in series between Vcc and ground. The gate of transistor 18 is connected to resistor 14 and the source of transistor 16, while the gate of transistor 16 is connected to resistor 12 and the drain of transistor 18. Furthermore, the channel of transistor 16 is connected to its source, and the channel of transistor 18 is connected to Vcc.

A voltage reference signal $V_{REF}$ is generated at $V_{REF}$ node 60 when a voltage is supplied by the voltage source block 8 to the programmable voltage divider block 6 at $V_{REF}$ node 60. The voltage reference signal $V_{REF}$ is essentially the intermediate voltage in a voltage divider circuit. This voltage divider circuit is formed when one or a combination of the transistor/resistors 50–53 are selected to establish a $V_{REF}$ node 60 to $V_{SS}$ node 62 branch. Resistor 14 and transistor 16 of the voltage source block 8 establish the $V_{REF}$ node 60 to Vcc branch. Voltage reference signal $V_{REF}$ is then the intermediate voltage between Vcc and $V_{SS}$ node 62.

The programmability of the voltage reference generator 10 results when switching transistors 40–43 are either turned off or on. Transistor/resistors 50–53 are selected either individually or in combination by proper voltage settings at the inputs 80–83. These inputs 80–83 are the voltage levels necessary to keep the switching transistors 40–43 in either the on state or the off state. When switching transistor 40 is in the on state, its corresponding transistor/resistor 50 will be bypassed. When turned on, the resistance through switching transistor 40 is such that it is essentially a conductor, and current will flow through switching transistor 40, shorting $V_{REF}$ node 60 to first node 70, rather than through transistor/resistor 50. When the voltage level at first input 80 is such that it turns off switching transistor 40, a voltage drop will occur across transistor/resistor 50, since in its off state, switching transistor 40 is not conducting. In the embodiment shown, where switching transistor 40 is a p-channel device, it is off when the gate voltage is not more than 1 Vt below the source voltage. Thus, a high voltage at first input 80, such as Vcc, is sufficient to turn off switching transistor 40.

The remaining transistor/resistors 51–53 are programmed in a similar fashion.

Through choosing various combinations of inputs 80–83, a wide range of resistance values may be achieved by selecting individual transistor/resistors 50–53 or any combination of transistor/resistors 50–53, resulting in several different levels of reference signal $V_{REF}$. For example, if the voltage level at first input 80 is such that switching transistor 40 is in its off state, and if the voltage levels at the other inputs 81–83 are such that switching transistors 41–43 are in the on state, then transistor/resistor 50 will be the only transistor/resistor enabled.

If, however, the voltage levels at second and fourth inputs 81 and 83 are such that switching transistors 41 and 43 are turned off, and the voltage levels at first and third inputs 80 and 82 are such that switching transistors 40, 42 are turned on, then the resulting resistance will be the sum of the resistance values of transistor/resistor 51 and transistor/resistor 53, since their respective resistance values will be in series.

Further, with regard to FIG. 1, $V_{REF}$ node 60 is also connected to each of the channels of transistor/resistors 50–53. In this configuration, the resistance values of transistor/resistors 50–53 can be modified to permit further variations of reference signal $V_{REF}$.

Figure 3:
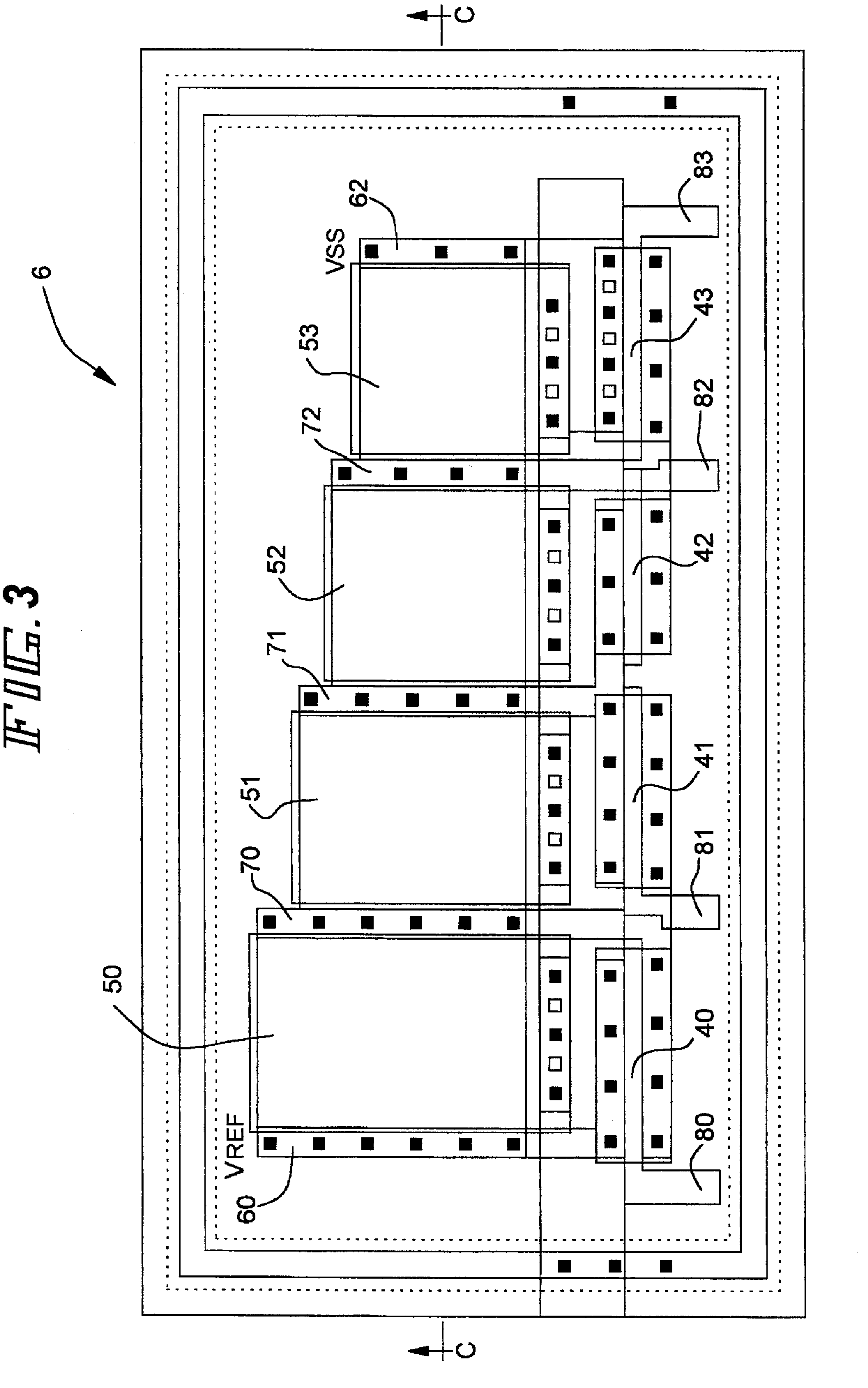
FIG. 3 is a chip layout of the circuit shown in FIG. 1.

FIG. 3 depicts a preferred chip layout of the programmable divider block 6 shown in FIG. 1. FIG. 3 shows how the geometries of transistors 50–53 may differ to establish different resistance values for each transistor/resistor. As shown in FIG.3, switching transistors 40–43 are disposed horizontally at the bottom of the Figure, and inputs 80–83 are received below them. Transistor/resistors 50–53 extend upward. Transistor/resistor 50 is longer than transistor/resistor 51, which is longer than transistor/resistor 52, which is longer than transistor/resistor 53. The longer the transistor, the lower its "on" resistance. $V_{REF}$ node 60 extends vertically at the left side of FIG. 3, and $V_{SS}$ node 62 extends vertically at the right side of the Figure. Nodes 70, 71, and 72 are shown also extending vertically from contact points in switching transistors 40/41, 41/42, and 42/43. Nodes 60, 70–72, and 62 may be formed of metal, doped polysilicon, polycide, or other suitable conductive material. In FIG. 3, the conductors representing $V_{REF}$ node 60 and first node 70 are longest because they flank transistor/resistor 50, which is the longest. The conductors for nodes 71, 72, and 62 are progressively shorter, due to the shorter lengths of corresponding transistor/resistors 51, 52, and 53.

Figure 7:
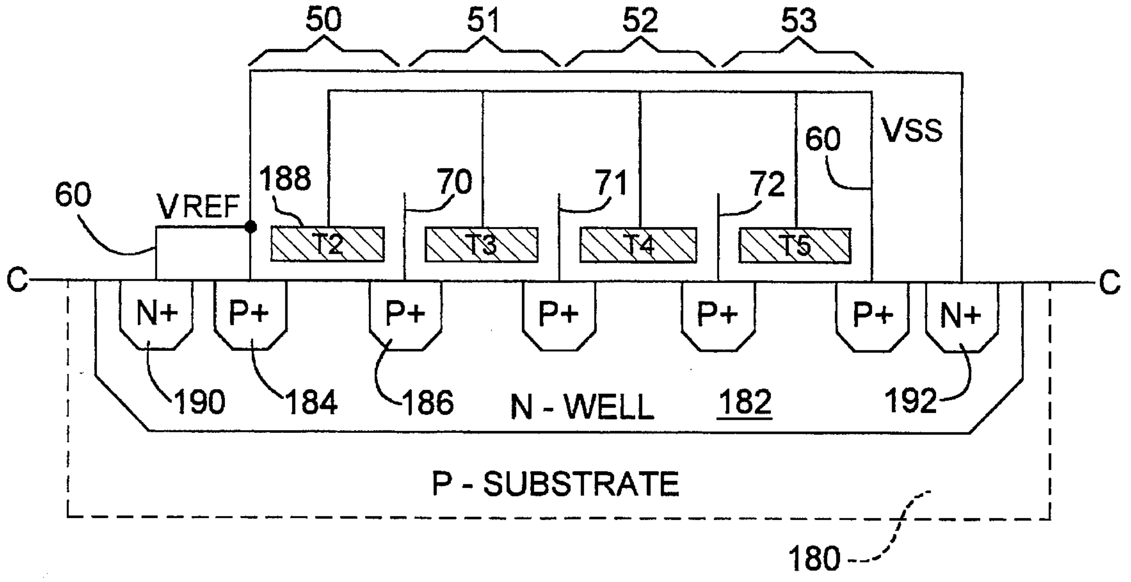
FIG. 7 is a cross section of the chip layout of FIG. 3 along line C.

FIG. 7 is a cross sectional view of the chip layout of FIG. 3 along line C. In FIG. 7, a region 180 is shown as being doped with p-type impurities. Region 180 may comprise a substrate, an epitaxial layer, a well, moat, or any other region of an integrated circuit device. Within region 180 is a further region 182, which is shown to be doped with n-type impurities. Region 182 may be referred to as a region, moat, or well. The p-channel transistor/resistors 50–53 and switching transistors 40–43 will be formed within and above region 182.

With respect to transistor/resistor 50, source and drain regions 184, 186 are shown as P+ regions within region 182. A gate electrode 188 is shown over the upper surface of region 182. Gate electrode 188 may be formed of polysilicon, a polycide, a metal conductor, or another conductive material as is commonly used in integrated circuit fabrication. (It should be understood that pad oxides below the gate electrodes, isolation oxide or other isolation mechanisms, interlevel dielectric, and passivation, as well as other regions normally seen in a cross sectional view of an integrated circuit, are not shown in FIG. 7 but have been omitted to promote clarity of illustration. Those skilled in the art will also understand that the gate electrodes and all other regions have some depth to them, and could extend significantly.)

Other source and drain regions, as well as the gate electrodes, are formed of similar materials as the source, drain, and gate electrode of transistor/resistor 50, thereby forming transistor/resistors 51, 52, and 53 to right side of transistor/resistor 50.

To the left of transistor/resistor 50 and to the right of transistor/resistor 53 in FIG. 7 there are shown regions 190 and 192 having impurities of N+. That is, they may be doped to a higher concentration than the concentration of impurities within region 182. Regions 190 and 192 are connected to $V_{REF}$ node 60, which is connected to the source region 184 of transistor 50. $V_{SS}$ node 62 is shown to be connected to the gates of each transistor 50–53 and also to the drain region of transistor 53.

Figure 2:
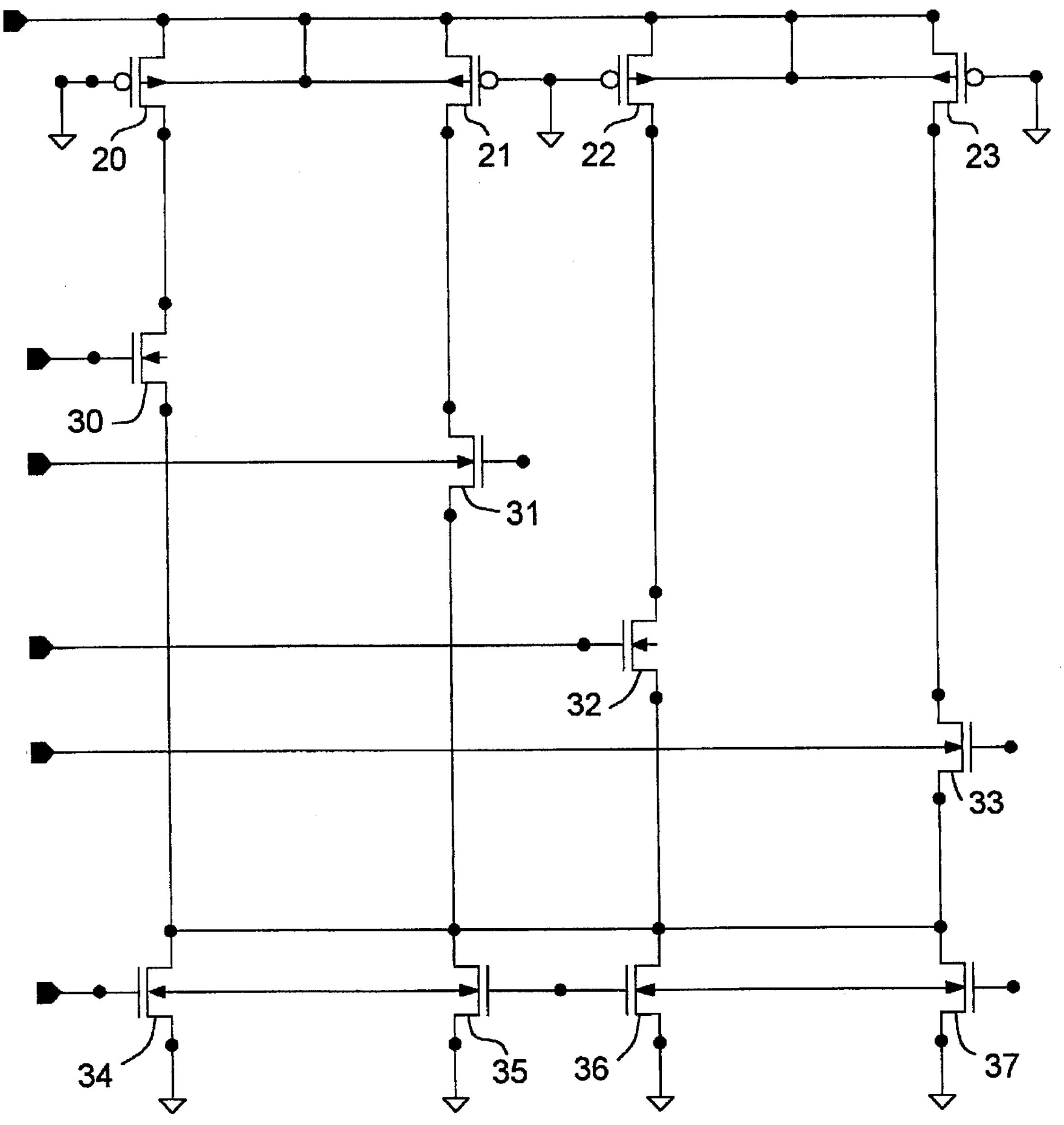
FIG. 2 PRIOR ART
FIG. 2 is a schematic diagram of a prior art programmable reference generator.
Figure 6:
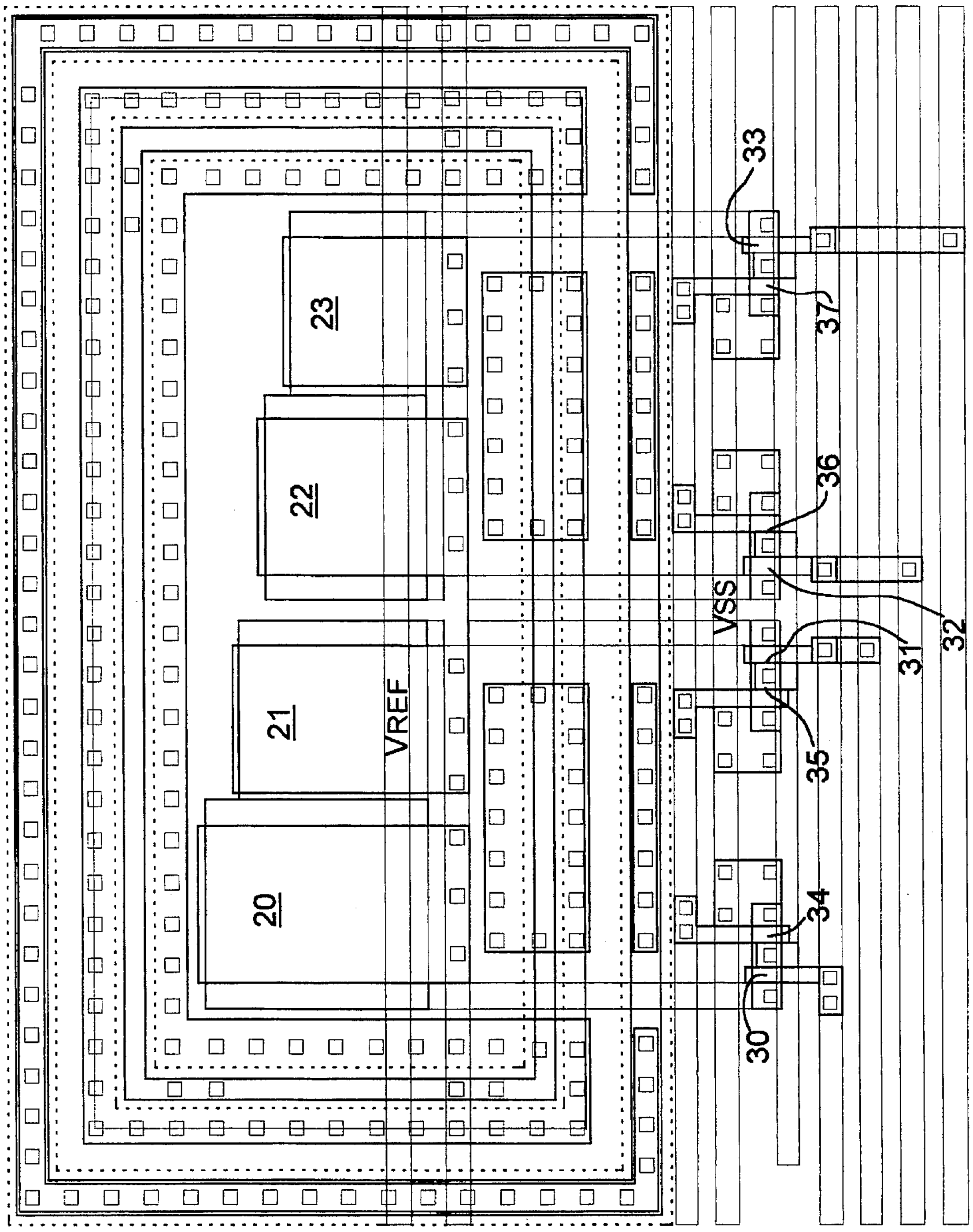
FIG. 6 PRIOR ART
FIG. 6 is a chip layout of the prior art circuit shown in FIG. 2.

FIG. 2 is a schematic diagram of a prior art voltage reference generator. One disadvantage in this circuit is that the switching transistors 30–33, as well as the enable switch transistors 34–37, are n-channel transistors, whereas the transistors configured as resistors 20–23 are p-channel transistors. Utilizing two different types of transistors increases the amount of area necessary to layout this technique on the integrated circuit, thus leaving less room for other components. This is clearly evident when comparing the layout of FIG. 3 with the layout of the prior art circuit in FIG. 6. It should be understood that the layout of FIG. 6 includes guard rings, which are not shown in any of the other chip layouts. Guard rings are common in the art of integrated circuit fabrication and were not included in determining the square area of the layout of FIG. 6. The FIG. 6 layout calls for an area of 1,670 square microns, where the resistive devices 20–23 are 10 microns wide and have lengths of 14.8, 12.5, 10.6, and 9 microns, respectively. The layout of FIG. 3, by comparison, calls for an area of only 1,300 square microns, a decrease of approximately 22%, using the same dimensions for resistive devices 50–53 as prior art resistive devices 20–23. Also evident is the fact that the present invention requires fewer transistors than the prior art, which further decreases the area necessary to layout the present invention on an integrated circuit.

Figure 4:
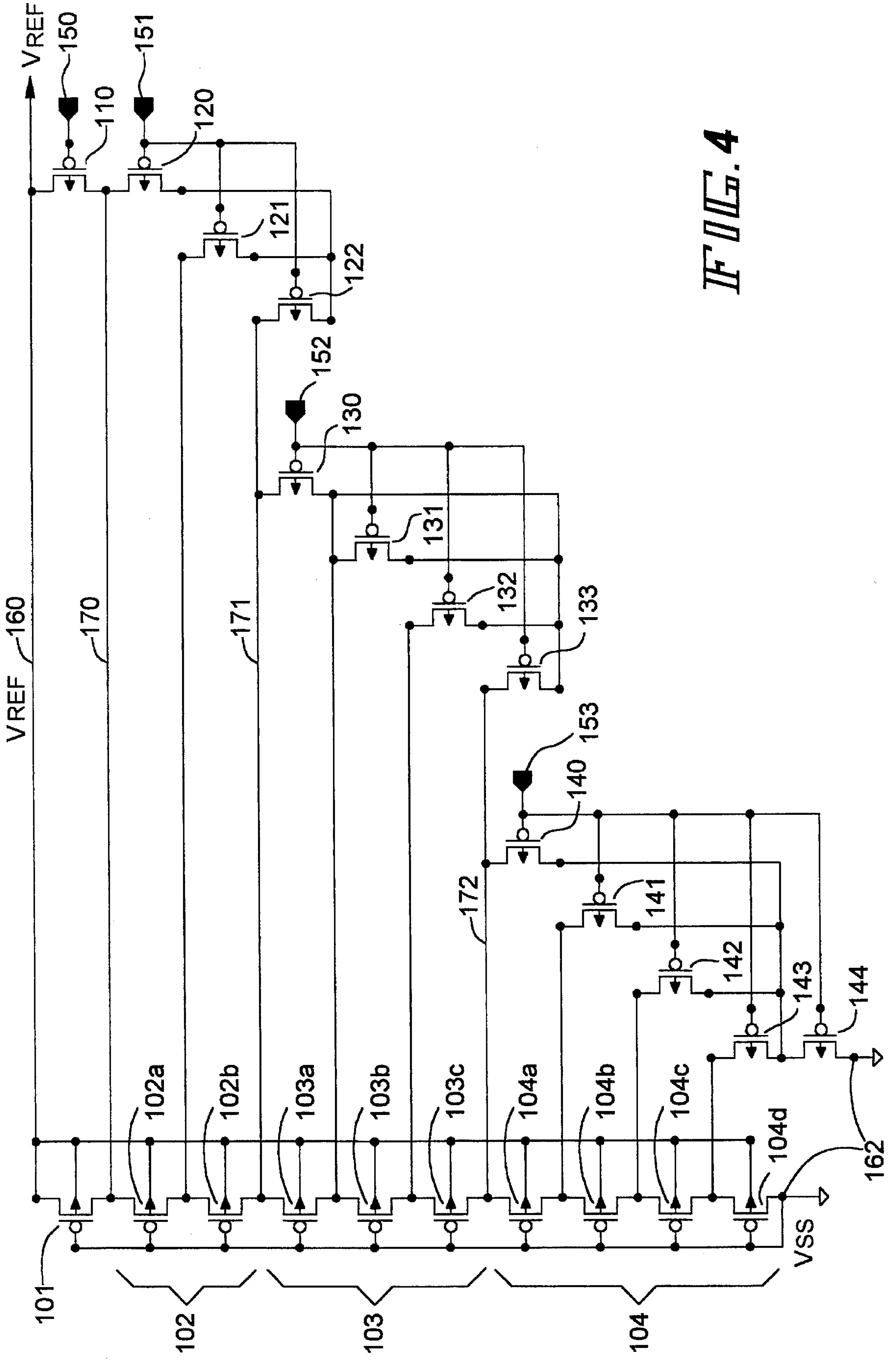
FIG. 4 is schematic diagram of a second embodiment of a programmable divider block of a programmable reference generator according to the present invention.

A second embodiment of the programmable divider block 6 according to the present invention is shown in the schematic diagram of FIG. 4. Nodes $V_{REF}$ 160 and $V_{SS}$ 162 in FIG. 4 correspond to nodes $V_{REF}$ 60 and $V_{SS}$ 62 in FIG. 1. The voltage source block 8 of FIG. 1 is also used with the embodiment of FIG. 4, and produces an output at $V_{REF}$ node 160. The output of FIG. 4 is taken from $V_{REF}$ node 160. The embodiment in FIG. 4 takes up very little space on the integrated circuit due to the fact that switching transistors 110, 120–122, 130–133 and 140–144 enable resistor segments of each transistor/resistor assembly or block 101–104. A transistor/resistor block may be comprised of one or a plurality of resistor segments, which are either enabled or bypassed simultaneously. Each resistor segment is comprised of a p-channel transistor.

Figure 5:
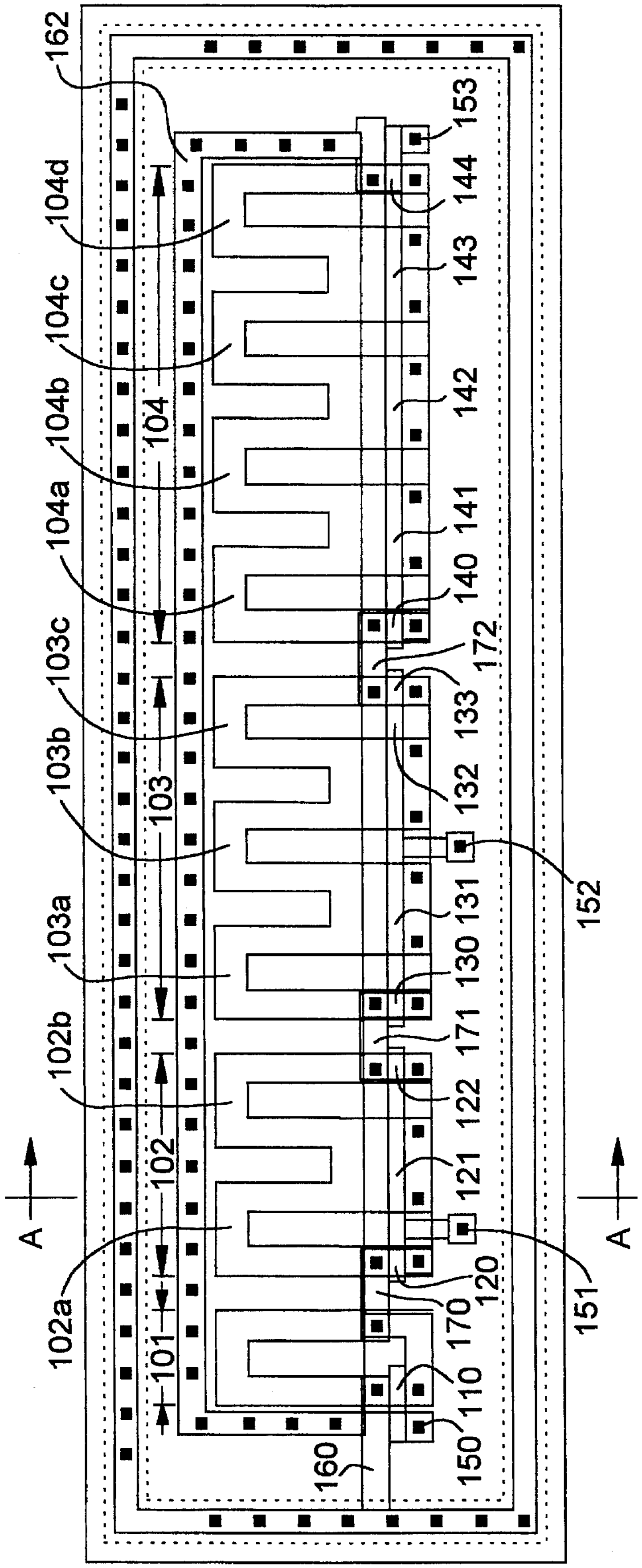
FIG. 5 is a chip layout of the circuit shown in FIG. 4.

FIG. 5 is a layout diagram of the FIG. 4 circuit. In this embodiment, each resistor segment 101, 102*a–b*, 103*a–c* and 104*a–d* is U-shaped when looked at from overhead. An example of this shape is shown at transistor/resistor block 101, which is essentially a one resistor segment. That is, FIG. 5 shows the several U-shaped structures formed in gate polysilicon. Regions within the vertical members of each "U" and regions between adjacent "U's" are comprised of active gate polysilicon, while the non-U-shaped areas comprise non-active gate polysilicon. As shown in FIG. 5, switching transistors 110, 120–122, 130–133, and 140–144 are disposed horizontally below transistor/resistor blocks 101–104, and inputs 150–153 are received below them. $V_{SS}$ node 162 surrounds the perimeter on all sides and is connected to the gate of each respective resistor segment and to the drains of resistor segment 104*d* and switching transistor 144. $V_{REF}$ node 160 is located at the left side of the Figure between switching transistor 110 and transistor/resistor 101. Nodes 170–172 are located in a horizontal line with $V_{REF}$ node 160. Nodes 160, 170–172, and 162 may be formed of metal, doped polysilicon, polycide, or other suitable conductive material.

Each transistor/resistor block 101, 102, 103, and 104 has more resistance than the prior one in sequence since each comprises, in this embodiment, one more resistance segment than the previous one. For example, while transistor/resistor block 101 has a single U-shaped element, transistor/resistor block 102 is comprised of series-connected first and second U-shaped resistor segments 102*a* and 102*b*, respectively. Transistor/resistor block 103 is comprised of series–connected first, second and third U-shaped resistor segments 103*a*, 103*b* and 103*c*, respectively. Finally, transistor/resistor block 104 is comprised of series-connected first, second, third and fourth U-shaped resistor segments 104*a*, 104*b*, 104*c* and 104*d*, respectively. It should be understood that any number of resistance values can be created in this manner simply by adding further resistor segments. The area of FIG. 5 is 1,400 square microns. Not only is this area smaller than the area of the prior art layout of FIG. 6, but the aspect ratio for the transistors in FIG. 5 is different than those in any other Figure. Thus, FIG. 5 illustrates another way the present invention can be implemented to accommodate various device configurations.

Figure 8:
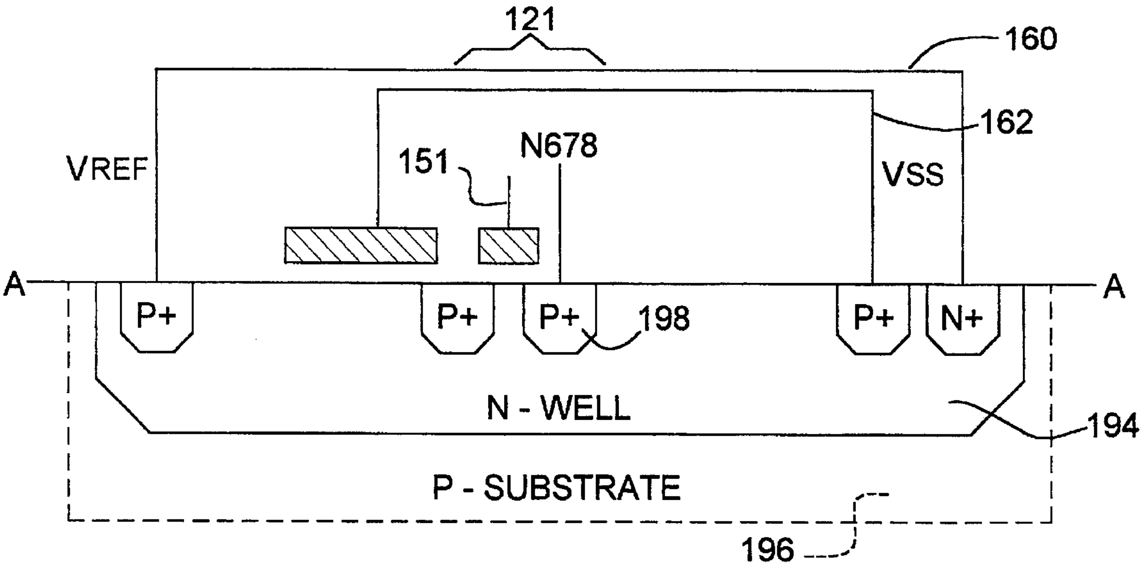
FIG. 8 is a cross section of the chip layout of FIG. 5 along line A.

FIG. 8 is a cross sectional view of the chip layout of FIG. 5 along line A. Similar to FIG. 7, an N-well 194 is disposed within a P-substrate 196. The p-channel transistors of this alternative embodiment will be formed within and above N-well 194.

The cross section of FIG. 8 is taken along one of the vertical members of U-shaped resistor segment 102*a*. Thus, only resistor segment 102*a* and switching transistor 121 are shown in the cross section of FIG. 8. The line N678 connected to the drain region 198 of switching transistor 121 represents the common drain node of switching transistors 120–122. As in FIG. 7, regions normally seen in a cross sectional view of an integrated circuit, such as pad oxides below the gate electrodes, isolation oxides or other isolation mechanisms, interlevel dielectric, and passivation, are not shown in FIG. 8 but have been omitted for promoting clarity of illustration. Other source and drain regions, as well as the gate electrodes, are formed of similar materials as the source, drain, and gate electrode for switching transistor 121.

The operation of this alternative embodiment will be described with reference to the schematic diagram of FIG. 4. Each resistor segment in FIG. 4, 101, 102*a–b*, 103*a–c*, and 104*a–d*, is comprised of a p-channel transistor and is shown as being enabled by a separate switching transistor. This is because the resistor segments of each transistor/resistor block are extended to where the switching transistors can enable each resistor segment.

The switching transistors that enable each resistor segment are all switched on or off by a single input. Specifically, the voltage at a first input 150 turns on or off switching transistor 110, a second input 151 turns on or off switching transistors 120–122 simultaneously, a third input 152 turns on or off switching transistors 130–133 simultaneously, and a fourth input 153 turns on or off switching transistors 140–144 simultaneously. For example, when third input 152 turns on switching transistors 130–133 simultaneously, this causes resistor segments 103$a$–$c$ to be bypassed. Similarly, when third input 152 turns off switching transistors 130–133 simultaneously, resistor segments 103$a$–$c$ are enabled. In the embodiment shown, where switching transistors 130–133 are p-channel devices, they are off when their gate voltage is not more than 1 Vt below their source voltage. Thus, a high voltage at third input 152, such as Vcc, is sufficient to turn off switching transistors 130–133.

The series of p-channel switching transistors 110, 120–122, 130–133, and 140–144 of FIG. 4 can enable or disable transistor/resistor blocks 101–104 in order to achieve a desired voltage at $V_{REF}$ node 160. For example, if transistor/resistor block 102 is chosen, first input 150 would be low, thus turning on switching transistor 110 and shorting $V_{REF}$ node 160 to a first node 170, thereby disabling transistor/resistor block 101. Third input 152 would also be low, simultaneously turning on switching transistors 130–133 and shorting a second node 171 to a third node 172, thereby disabling transistor/resistor block 103. Fourth input 153 would also be low, simultaneously turning on switching transistors 140–144 and shorting third node 172 to $V_{SS}$ node 162, thereby disabling transistor/resistor block 104. Finally, second input 151 would be high, simultaneously turning off switching transistors 120–122, thus enabling transistor/resistor block 102 and isolating first node 170 from second node 171.

Through choosing various combinations of inputs 150–153, a wide range of resistance values may be achieved by selecting individual transistor/resistor blocks 101–104 or any combination of transistor/resistor blocks 101–104, resulting in several different voltage levels at first node 161. Additionally, even wider ranges of resistance values may be achieved by adding or deleting resistor segments to respective transistor/resistor blocks.

Figure 9:
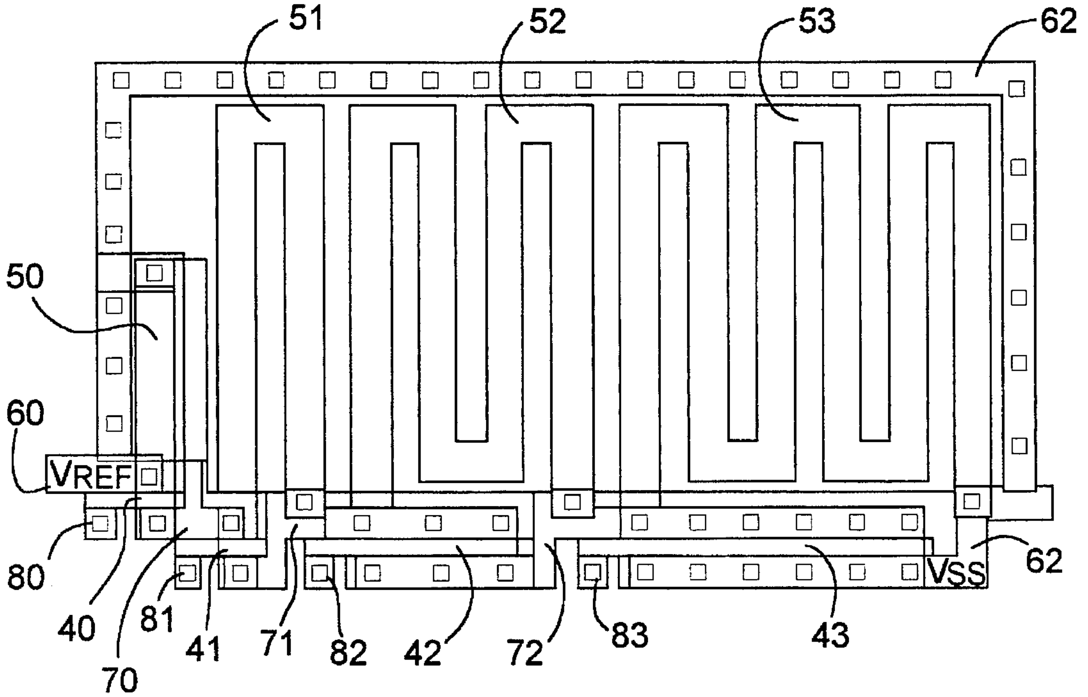
FIG. 9 is an alternative chip layout of the circuit shown in FIG. 1.

FIG. 9 represents an alternative chip layout of the schematic diagram of FIG. 1. The reference numbers used in FIG. 9 are thus the same numbers used in FIGS. 1 and 3. FIG. 9 is similar to FIG. 5 in that some of the transistor/resistors comprise U-shaped segments, and is constructed in a similar fashion. Thus, a cross section of FIG. 9, taken along a line similar to line A of FIG. 5, would look similar to the cross section of FIG. 5 which is shown in FIG. 8. FIG. 9 shows a rectangular region and several U-shaped regions formed in gate polysilicon. The rectangular region, the regions within the vertical members of each "U", and regions between adjacent "U's" are comprised of active gate polysilicon, while the other areas comprise non-active gate polysilicon. In FIG. 9, transistor/resistor 50 is comprised of a rectangular resistor segment, transistor/resistor 51 is comprised of a U-shaped resistor segment, transistor/resistor 52 is comprised of two U-shaped resistor segments, and transistor/resistor 53 is comprised of three U-shaped resistor segments. Switching transistors 40–43 are disposed below transistor/resistors 50–53, and inputs 80–83 are received below them.

Figure 10:
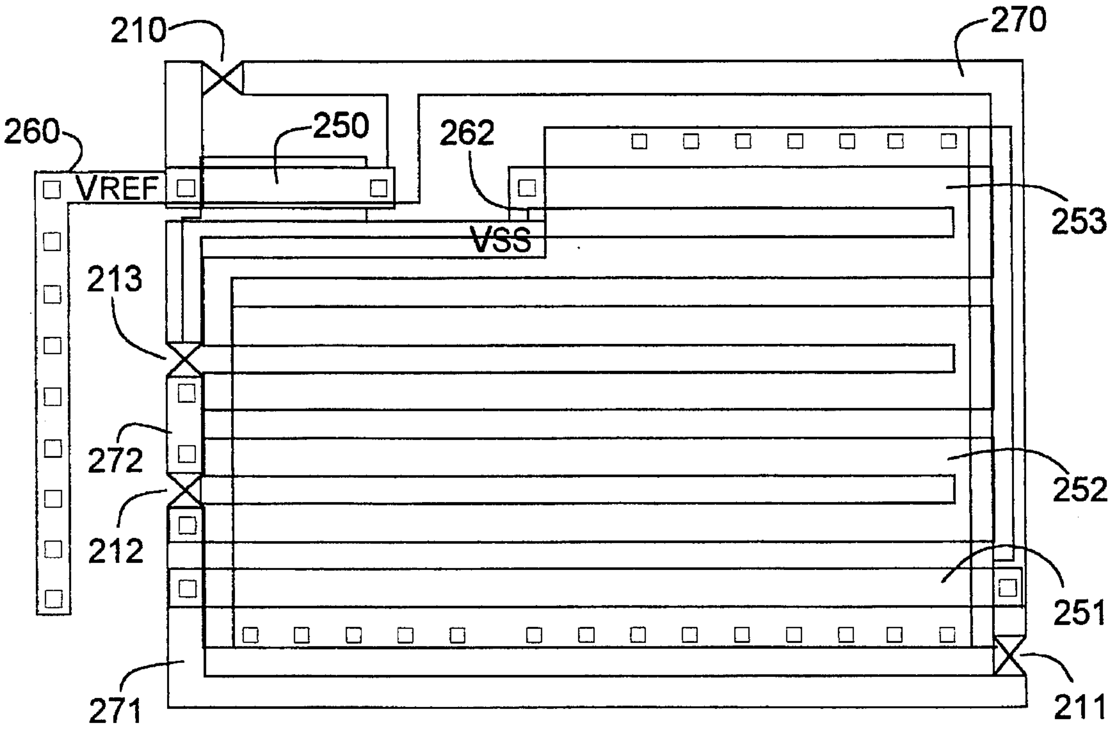
FIG. 10 PRIOR ART
FIG. 10 is a chip layout of a prior art programmable reference generator.
Figure 11:
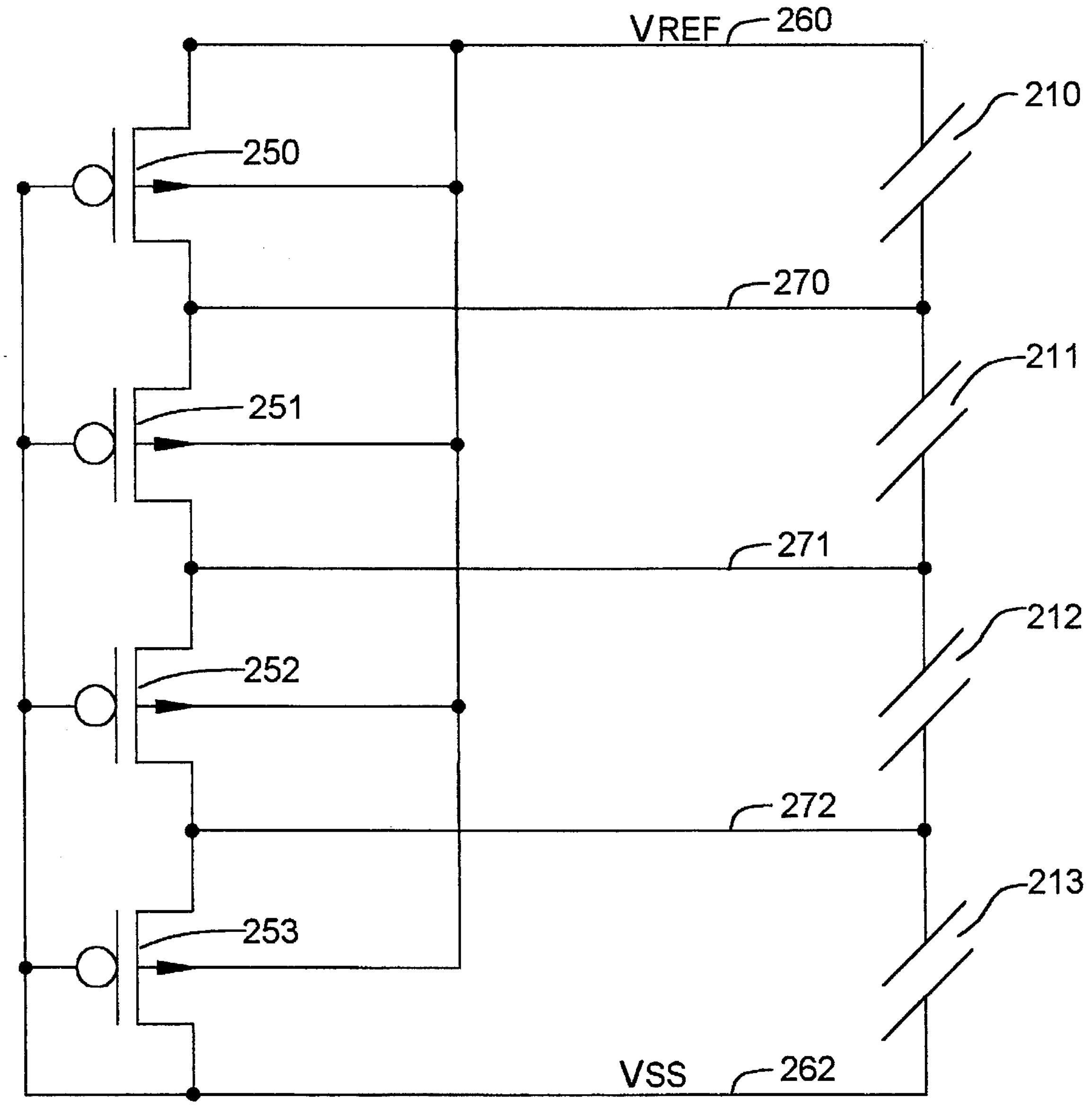
FIG. 11 PRIOR ART
FIG. 11 is a schematic diagram of the chip layout of FIG. 10.

FIG. 10 is drawn to contrast a prior art reference generator with the alternative layout of FIG. 9. While the areas of FIG. 9 and 10 are both approximately 1,125 square microns, the prior art reference generator of FIG. 10 has no option transistors associated with it and thus is not programmable. FIG. 10 only includes metal options, a one-time only event. These metal options are shown in the associated schematic of FIG. 11 as 210–213.

The present invention saves space in an integrated circuit in that the switching transistors essentially overlap the area used by the resistor segments. This can be dearly seen in FIG. 5. For example, switching transistors 140–144 overlap the area used by resistor segments 104$a$–$d$ of transistor/resistor 104. A similar layout is used for transistor/resistors 101–103.

Reference has been made to regions that are "doped" with impurities. The impurities can enter such regions by doping implantation, or other standard processes commonly used in integrated circuit fabrication.

Those skilled in the art will notice various modifications that can be made to the preceding embodiments without departing from the spirit and scope of the invention.

What is claimed is:

1. A programmable divider circuit for connection to a voltage source and to provide a programmable reference voltage, the divider circuit comprising, on an integrated circuit:

a plurality of N (where N is an integer greater than 2) first, conductive, spaced-apart regions extending parallel to one another in a first direction, a first one of said first conductive regions providing a reference voltage output node, another one of said first conductive regions providing a ground voltage node, and remaining ones of said first conductive regions providing circuit nodes;

a plurality of first gate elements extending along said first direction, parallel to said first conductive regions, and located therebetween so that each said first gate element coupled in series corresponds to and in plan view extends between two of said first conductive regions, whereby a plurality of first transistors are established for use as resistive elements;

wherein at least two of said transistors have different resistance characteristics;

a second conductive region extending in a second direction which is not parallel to said first direction;

a plurality of second gate elements extending parallel to one another and intersecting said second conductive region in plan view to form N-1 second transistors;

said plurality of first regions intersecting said second region in plan view and making electrical contact therewith, so that each said second transistor is coupled parallel to a corresponding first transistor;

wherein said first and said second transistors are one of all n-type or one of all p-type.

2. The circuit of claim 1, wherein said first transistors have a plurality of differing gate electrode dimensions.

3. The circuit of claim 2, wherein each said first transistor has a gate electrode length different from the gate electrode length of all other first transistors.

4. The circuit of claim 3, wherein said second direction is perpendicular to said first direction, wherein said reference voltage node is located along one edge of said circuit and wherein said ground voltage node is located along another edge of the circuit.

5. The circuit of claim 3, wherein said first regions are located within an integrated circuit substrate, and wherein said first gate elements are located above said substrate.

6. A programmable divider circuit for a voltage divider having a voltage source coupled to the divider circuit, the divider circuit comprising:

a plurality of first transistors for use as resistive elements coupled in series;

wherein said transistors are arranged in N groups, where N is an integer greater than 2, said N groups having differing numbers of transistors therein so that at least one said group has a different number of transistors therein than at least one other group so that at least two of said groups have different resistance characteristics;

wherein, for each of said groups having more than one transistor therein, said first transistors have a common gate electrode for the group;

a plurality of first, conductive regions, a first one of said first regions providing a reference voltage output node, another one of said first regions providing a ground voltage node, and remaining ones of said first regions providing circuit nodes;

said first conductive regions providing electrical connection between adjacent ones of said groups of first transistors;

a plurality of second gate electrodes each located beside a corresponding first conductive region and extending across its corresponding group to connect electrically one end of said common gate electrode for that group to another end thereof;

a plurality of second conductive regions located beside said second gate electrodes to form a plurality of second transistors so that when said second transistors turn on, the corresponding first transistors are shorted;

wherein said first and said second transistors are one of all n-type or one of all p-type.

7. The circuit of claim 6, wherein said common gate electrodes are shaped generally like a square wave signal waveform.

* * * * *